United States Patent [19]

Numakura et al.

[11] 3,918,085

[45] Nov. 4, 1975

[54] MAGNETIC RECORDING AND/OR REPRODUCING APPARATUS

[75] Inventors: Toshihiko Numakura; Kazuo Yamagiwa, both of Tokyo; Akira Saito, Kanagawa, all of Japan

[73] Assignee: Sony Corporation, Tokyo, Japan

[22] Filed: Jan. 10, 1975

[21] Appl. No.: 539,997

[30] Foreign Application Priority Data

Jan. 12, 1974 Japan .................................. 49-6845

[52] U.S. Cl. ......................... 358/4; 360/18; 360/33

[51] Int. Cl.² ............................................. H04N 5/79

[58] Field of Search .................. 358/4; 325/30, 163; 360/18, 19, 20, 24, 29, 33, 34; 178/66 A

[56] References Cited

UNITED STATES PATENTS

| | | | |
|---|---|---|---|
| 3,167,712 | 1/1965 | Young, Jr. et al. | 325/163 |
| 3,451,012 | 6/1969 | Spiro | 325/30 |
| 3,454,718 | 7/1969 | Perreault | 325/163 |
| 3,821,787 | 6/1974 | Kihara | 358/4 |

*Primary Examiner*—Robert L. Griffin
*Assistant Examiner*—John C. Martin
*Attorney, Agent, or Firm*—Lewis H. Eslinger; Alvin Sinderbrand

[57] ABSTRACT

In recording periodic information signals, such as, the chrominance signal components of color video signals, having first or field intervals which are further subdivided into second or line intervals and which are recorded in successive parallel tracks on a record medium, interference or cross-talk between signals recorded in adjacent tracks is reduced or eliminated during reproduction by recording the information signals in adjacent tracks with first and second carriers having different frequencies. Upon reproducing the information signals recorded in adjacent tracks with such first and second carriers, the reproduced signals are reconverted to have a common carrier frequency by means of respective first and second reconverting signals which similarly have different frequencies selected so that, although an information signal reproduced from a particular track and reconverted to the common carrier frequency will pass through a comb filter, the cross-talk signals reproduced simultaneously from adjacent tracks will be reconverted to have carrier frequencies at nodes of the comb filter so as to be eliminated by the latter. The circuits by which the first and second carriers and the first and second reconverting signals are produced during recording and reproducing operations, respectively, each include a phase-locked loop having a voltage-controlled variable frequency oscillator whose output frequency is suitably changed in successive field intervals, and preferably in which the center frequency of the voltage-controlled variable frequency oscillator is also changed in the successive field intervals for obtaining rapid stabilization of the respective output frequency.

30 Claims, 19 Drawing Figures

MAGNETIC RECORDING AND/OR REPRODUCING APPARATUS

BACKGROUND OF THE INVENTION

1. Field of the Invention

This invention relates generally to the recording and reproduction of information signals, such as, for example, color video signals, and more particularly is directed to improved apparatus for the reduction of cross-talk in the reproduction of signals recorded in adjacent tracks, even though the relatively low frequency chrominance signal compounds of color video signals are recorded for every line interval and the tracks are very close together, or even may be overlapping.

2. The Prior Art

It is well-known to record video signals on magnetic tape or other forms of record medium by scanning successive parallel tracks on the record medium with one or more transducers energized by the video signals. There has been a constant effort to improve the efficiency of use of the record medium by packing the tracks as close together as possible. The packing density has always been limited by, among other things, the fact that, during reproduction of the recorded signals, a reproducing transducer scanning each of the tracks in order could pick up signals or cross-talk from adjacent tracks.

One effort made to minimize cross-talk has been to use two transducers having air gaps with different azimuth angles for successive lines. This is relatively easy to do because most magnetic recording apparatus for video signals includes a rotary drum provided with two transducers or heads which can have gaps with different azimuth angles. The tape is wrapped helically about a portion of the perimeter of the drum and moved longitudinally along this helical path while the transducers or heads are rotated, thus bringing the heads alternately into recording relationship with the tape and allowing each head to trace out a respective one of the tracks. Each transducer or head has a finite width and thus produces magnetization of those magnetic domains in the material on the tape in what would appear to be, if such domains were visible, a series of parallel lines or stripes, each having a length as great as the width of the track, and each having an orientation that corresponds to the azimuth angle of the gap of the transducer or head used to record that track.

By recording successive alternate tracks with transducers or heads having different azimuth angles, and in view of the fact that the reproducing transducers or heads would also have corresponding azimuth angles, the gap of the reproducing transducers or heads would be aligned with the parallel, but fictitious, lines of the track being scanned thereby, but, because of the difference in azimuth angles, would extend at an angle to such lines of the next adjacent track. If the reproducing transducer overlapped that adjacent track, the well-known azimuth loss would result in attenuation of the signal reproduced from the adjacent track. Even if the reproducing transducer accurately scans a track recorded with the same azimuth, the reproducing transducer may still be influenced by the signals recorded in adjacent tracks with different azimuths, but the azimuth loss will decrease or eliminate the effect of such signals recorded in adjacent tracks on the output signal of the transducer.

Even in the above type of recording with different azimuth angles, there is still a limit to the overlapping or abutting of adjacent tracks. This is due in part to the fact that some of the recorded information may include relatively low frequencies, and the azimuth loss is generally proportional to the frequency of the signals. Thus, interference due to cross-talk from low frequency signals, such as, a frequency converted chrominance signal component, is not reduced to the same degree by the use of transducers having different azimuth angles as cross-talk from high frequency signals, such as, a frequency modulated luminance signal component.

In an existing arrangement for minimizing cross-talk of low frequency information, as disclosed in U.S. Pat. No. 3,821,787, issued June 28, 1974, and having a common assignee herewith, the relatively high frequency luminance components are recorded during every line area increment on every track, but the low frequency chrominance components are not recorded in adjacent line increment areas of adjacent tracks. If this type of recording were visible, the chrominance components would appear to be recorded in a checkerboard-like pattern. Furthermore, the luminance components could also be recorded intermittently in this same way to permit even further overlapping of adjacent tracks. In the reproduction of signals recorded with this checkerboard-like pattern, the components that were recorded only intermittently are utilized directly upon reproduction and are delayed for the length of time necessary to permit them to be used during the next succeeding interval in which similar information was not recorded. This system reduces the cross-talk interference but at some sacrifice in the quality of the reproduced image, due to the fact that less information was recorded than was available.

In order to reduce or eliminate the cross-talk interference while avoiding the above mentioned reduction of the quality or resolution of the reproduced image, it has been proposed, for example, as disclosed in detail in U.S. patent application Ser. No. 492,330, filed July 26, 1974, and also having a common assignee herewith, to selectively frequency convert the chrominance components of the color video signal so as to record the same with first and second carriers having different frequencies in the adjacent tracks, respectively. Upon reproducing the signals recorded in acjacent tracks with such first and second carriers, respectively, for the chrominance components, the chrominance signal components are selectively frequency reconverted to a common carrier frequency by means of respective first and second reconverting signals which similarly have different frequencies selected so that, although the chrominance signal component reproduced from a particular track and reconverted to the common carrier frequency will pass through a comb filter, the cross-talk signals reproduced simultaneously from adjacent tracks will be selectively reconverted by the first or second reconverting signal to have carrier frequencies at nodes of the comb filter so as to be blacked or eliminated by the latter.

The last described arrangement for recording and/or reproducing color video signals is advantageous in that both the luminance and chrominance signal components can be recorded for every line interval of the fields recorded in adjacent tracks which may be abutting for optimum utilization of the record medium without detracting from the quality or resolution of the picture or image resulting from the signals when reproduced. However, some difficulties have been experienced in respect to the circuits provided for producing the first and second carriers with which the chrominance signal component is recorded in acjacent tracks and for producing the first and second reconverting signals by which the reproduced chrominance signal components are reconverted to a common carrier frequency.

For example, circuits disclosed in said U.S. patent application Ser. No. 492,330 for producing the first and second carriers and the first and second reconverting signals during recording and reproducing operations, respectively, may each include two oscillators having output frequencies that differ from each other by one-half the horizontal or line frequency, and a switching device switched in successive field intervals to alternately apply the outputs of the two oscillators to a frequency converter. Although the foregoing arrangements permit the chrominance signal components to be recorded in adjacent tracks with first and second carrier frequencies that desirably differ only slightly from each, for example, by one-half the horizontal or line frequency, difficulties are encountered in accurately adjusting the two oscillators to provide the requisite output frequencies, and the use of two oscillators in such circuits undesirably increases the cost thereof. In another embodiment of the circuits for producing the first and second carriers or the first and second reconverting signals during recording or reproducing operations, respectively, a single oscillator is provided with its output frequency locked to a predetermined value and a switching device is again switched in successive field intervals to alternately apply to a frequency converter either such output frequency of the oscillator or the output of the oscillator passed through a frequency divider and then through a frequency multiplier. With the last mentioned circuit arrangement, it is necessary, in order to avoid undesirable complexity, that the first and second carrier frequencies with which the chrominance signal component is recorded in adjacent tracks differ from each other by a relatively great value, for example, by 14 ½ times the horizontal or line frequency. By reason of such large difference between the first and second carrier frequencies with which the frequency converted chrominance signal component is selectively recorded, it is difficult to maintain an adequate separation between the bands of the luminance and chrominance signal components, as recorded, with the result that difficulties arise in separating the luminance and chrominance signal components from the reproduced signals.

OBJECTS AND SUMMARY OF THE INVENTION

Accordingly, it is an object of the invention to provide improved circuit arrangements for producing the first and second carriers and the first and second reconverting signals in an apparatus for recording and/or reproducing color video signals, as aforesaid.

More specifically, it is an object of this invention to provide a recording and/or reproducing apparatus, as aforesaid, in which the circuits for producing the first and second carriers and the first and second reconverting signals during recording and reproducing operations, respectively, each include a single variable frequency oscillator adapted to provide the first and second carriers and the first and second reconverting signals with only relatively slight differences between their respective frequencies.

In accordance with an aspect of this invention, the circuits for providing the first and second carriers and the first and second reconverting signals during recording and reproducing operations, respectively, each include a phase-locked loop having the variable frequency oscillator as a voltage-controlled component thereof, with the output frequency of the voltage-controlled oscillator being suitably changed in successive field intervals of the color video signal being recorded or reproduced.

Further, in preferred embodiments of the invention, the center frequency of the voltage-controlled oscillator is changed in successive field intervals so that the output frequency of such oscillator will be rapidly stabilized upon each change-over thereof.

The above, and other objects, features and advantages of the invention, will be apparent in the following detailed description of illustrative embodiments which is to be read in connection with the accompanying drawings.

DETAILED DESCRIPTION OF THE PREFERRED EMBODIMENTS OF THE INVENTION

Figure 1:
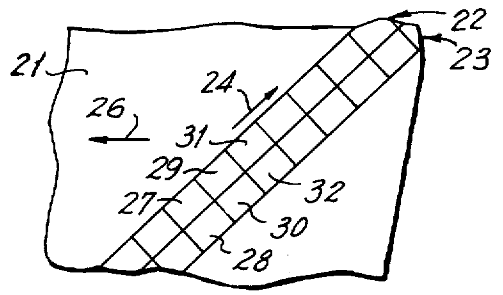
FIG. 1 shows a fragment of a record medium illustrating portions of two tracks in which signal information may be recorded.

FIG. 1 shows a section of a record medium 21 on which there are two tracks 22 and 23 recorded in that order due to relative movement in the directions of the arrows 24 and 26 between the medium 21 and recording transducers (not shown). Only two tracks 22 and 23 are shown, although in the normal recording of signal information there would be a large number of such tracks. Each track is divided into areas or increments of which the increments 27–32 are illustrative. Each of these areas or increments has recorded on it the signal information of one interval, for example, a line interval of a video signal that is divided into line intervals and field intervals. Usually, but not necessarily, each track 22 and 23 includes a line increment or area for each line interval of one field of the television signal.

Each line interval and each field interval contains a blanking and synchronizing portion, and in accordance with accepted practice, the tracks 22 and 23 are shown with the increments 27–32, as well as all of the other increments, arranged in a pattern referred to as H-alignment. This is achieved by regulating the relative movements along the directions 24 and 26 in accordance with the synchronizing portions of the video signal to be recorded so that the section of the increment or area 27, for example, on which the blanking and synchronizing signal is recorded in the track 22 is aligned with the section of the abutting increment or area 28 on which the blanking and synchronizing signal for that line interval is recorded in the adjacent track 23. This reduces the cross-talk of blanking and syncrhonizing signal information from one track to the other.

The tracks 22 and 23 in FIG. 1 are shown recorded in such a way that they are contiguous. It is assumed that the width of each of the transducers (not shown) used to record the tracks is exactly equal to the width of the respective track 22 or 23. Signals recorded on contiguous tracks as shown in FIG. 1 would produce cross-talk interference from one track to the other during reproduction or playback, because the reproducing transducer (not shown) scanning track 22 would unavoidably be energized slightly by the magnetic field of the adjacent edge of the track 23.

In accordance with accepted practice, the luminance components of a color video signal can be treated separately from the chrominance components. More specifically, the luminance components modulate a carrier so that they are recorded in a higher frequency portion of the available frequency band. If the tracks 22 and 23 are then recorded by respective transducers having different azimuth angles of their respective gaps, and the same azimuth angles are used in transducers respectively reproducing video information recorded in tracks 22 and 23, then the well-known azimuth loss would result in attenuation of the signal reproduced from track 23 during the scanning of track 22. However, the chrominance signal components, in accordance with well-known practice, are frequency converted from a band around the normal chrominance carrier frequency, which in the case of the NTSC signal is approximately 3.58 MHz, to a relatively low frequency of about 600 to 700 KHz. Since the azimuth loss is generally proportional to the frequency of the signals, the interference due to cross-talk from low-frequency signals, such as the frequency-converted chrominance signal components, is not reduced to the same degree, by the use of transducers having different azimuth angles, as is cross-talk from high frequency signals, such as the frequency-modulated luminance signal components. Thus, even if transducers having different azimuth angles are used for the recording of tracks 22 and 23 on FIG. 1, and then for the reproducing of the recorded signals, chrominance information recorded in the area or increment 28 of track 23 would be picked up by the transducer traversing the area or increment 27 when scanning track 22 and would create cross-talk interference with the chrominance signal reproduced from the area or increment 27. The reverse would also be true.

As disclosed in detail in U.S. patent application Ser. No. 492,330, identified more fully above, such cross-talk interference may be reduced or eliminated by selectively frequency converting the chrominance signal components of the color video signal so as to record the same in adjacent tracks 22 and 23 with first and second carriers having different frequencies, whereupon, in reproducing the recorded signals, the chrominance signal components are selectively frequency reconverted to a common carrier frequency by means of alternately employed first and second reconverting signals which similarly have different frequencies. The frequencies of the first and second carriers with which the chrominance signal components are recorded in adjacent trakcs and the frequencies of the first and second reconverting signals are selected so that, although the chrominance signal component reproduced from a particular track, for example, the track 22 on FIG. 1 in which the chrominance signal component is recorded with the first carrier, and reconverted to the common carrier frequency by the first reconverting signal will pass through a comb filter, the cross-talk signals from the adjacent track 23, in which the chrominance signal component has been recorded with the second carrier, will be frequency-reconverted by the first reconverting signal to have a carrier frequency at a node of the comb filter so as to be blocked or eliminated by the latter.

The foregoing scheme for reducing or eliminating cross-talk interference is employed in recording and/or reproducing color video signals according to this invention. Thus, for example, as shown in detail on FIG. 2, in a recording apparatus according to this invention, a color video signal input terminal 33 is provided to receive a composite video signal that includes both luminance and chrominance components and is composed of line, field, and frame intervals with blanking and synchronizing portions in each of those intervals. A low pass filter 34 is connected to the input terminal 33 for separating the luminance signal component from the composite or color video signal and for supplying the separated signal to a delay circuit 35 that, in turn, supplies a signal to a frequency modulator 36. The frequency modulator 36 includes a source for generating a carrier, the frequency of which is to be modulated by the luminance signal component. The output of the frequency modulator 36 is fed through a high pass filter 37 to a mixing circuit 38.

The input terminal 33 is also connected to a comb filter 39 or band pass filter that separates out the chrominance signal components of the composite video signal. The output of comb filter 39 is connected to a frequency onverter 40, and first and second frequency converting signals are alternately supplied to frequency converter 40, as hereinafter described in detail, so that the chrominance signal components are frequency converted in converter 40 to have a first or second carrier frequency, respectively. The frequency converted chrominance signal components are supplied from the converter 40 through a band pass filter 41 to mixer 38. Thus, the output of mixer 38 is a composite signal comprised of the frequency modulated luminance signal component and the frequency converted chrominance signal components, and such composite signal is applied through an amplifier 42 to rotary magnetic heads or transducers 43 and 44 which alternately record the received composite signal in successive tracks on a magnetic tape record medium 45.

The input terminal 33 is also connected to a vertical synchronizing signal, or as it is more commonly called, sync, separator circuit 46, the output of which is applied to a flip-flop circuit 47. The flip-flop 47 is connected to a servo-control circuit 48 that controls the rotational speed of a motor 49 for driving rotary heads 43 and 44 so that, for example, each of the rotary heads will scan a record track on the tape 45 in a field interval of the color video signal supplied to input terminal 33. As is conventional, the heads 43 and 44 may be disposed at opposite ends of an arm 50 fixed on the shaft 51 of motor 49 for movement along a gap or slot 52 defined between upper and lower portions of a drum 53 (shown in broken lines) about which the magnetic tape 45 is helically wrapped so that the successive record tracks extend obliquely across the tape. The tape 45 is further driven longitudinally, as by a capstan (not shown), and the output of flip-flop 47 is also applied to a fixed magnetic head or transducer 54 located to record spaced apart control signals along one edge of the tape 45 as the latter is longitudinally advanced or driven.

Figures 3A, 3B:
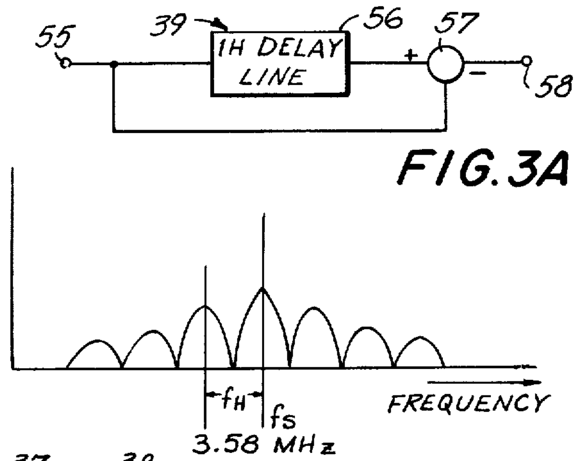
FIGS. 3A and 3B respectively show a comb filter and its frequency response characteristic.
Figure 2:
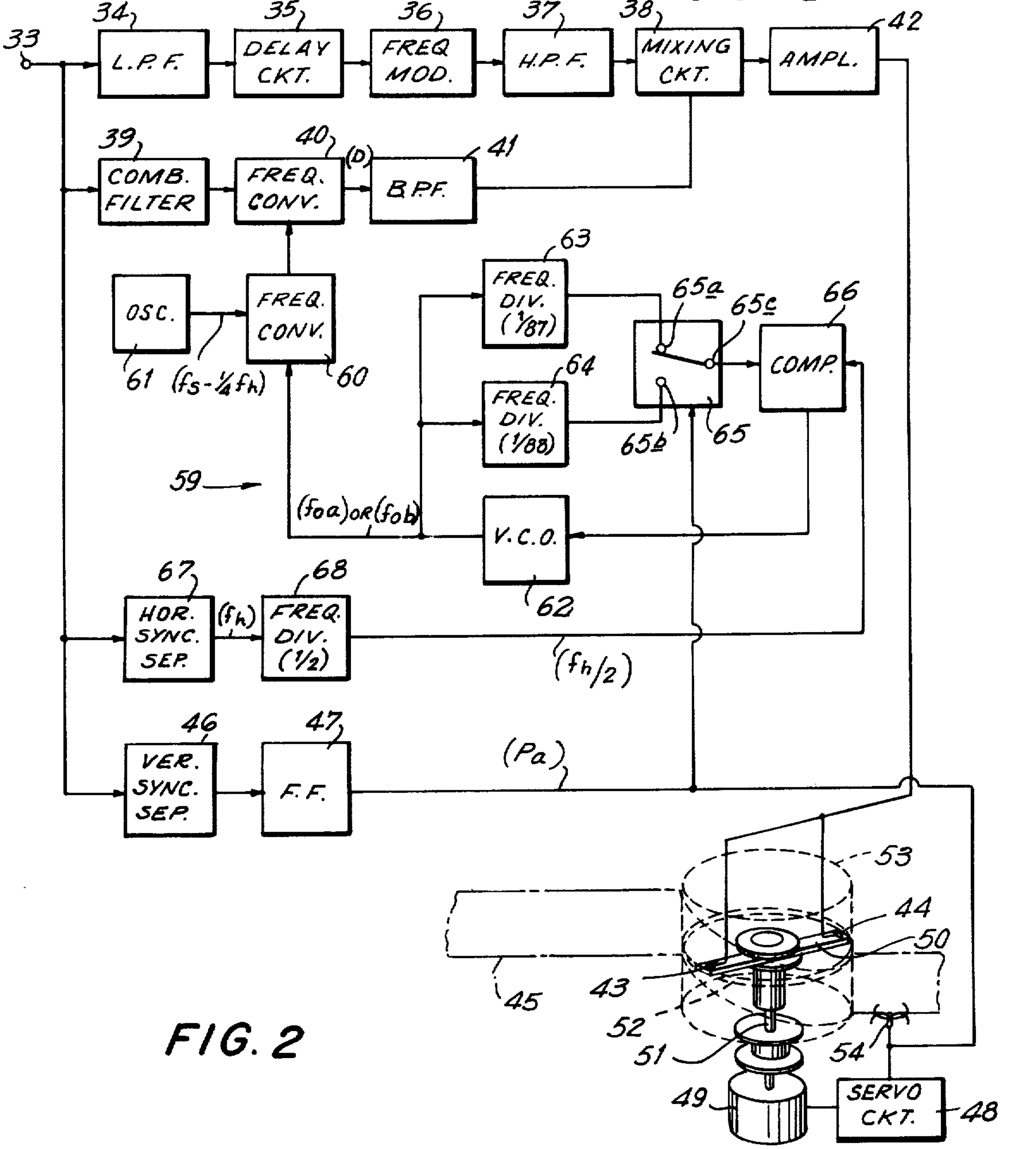
FIG. 2 is a block diagram of basic components of a recording apparatus according to an embodiment of this invention for minimizing cross-talk interference between frequency converted chrominance components of a video signal.

Before further describing the recording apparatus of FIG. 2, it is desirable to consider briefly the comb filter 39 which is shown on FIG. 3A to comprise an input terminal 55 connected to a delay line 56 that delays signals passing through it by one horizontal line interval, which in the case of the NTSC signal is approximately 1/15, 750th of a second. Both the input terminal 55 and the output of the 1H delay line 56 are connected to input terminals of a combining circuit 57 that has an output terminal 58. As is apparent from the frequency response characteristic of filter 39 shown on FIG. 3B, filter 39 transmits most readily those signals close to a frequency $f_s$, which is the carrier frequency of the chrominance components and in the case of the NTSC signal is approximately 3.58 MHz. The filter 39 also transmits, but with somewhat greater attenuation, signals whose frequency differs from the frequency $f_s$ by a frequency $f_h$, which is the fundamental frequency of the line repetition rate of approximately 15.75 KHz, and by other integral multiples of the frequency $f_h$. These are the frequencies of components of the chrominance signal. However, the filter 39 substantially completely rejects signals having frequencies that differ from the frequency $f_s$ by odd multiples of $\frac{1}{2} f_h$. These are exactly the frequencies of the luminance signal components in the composite video signal. Thus a comb filter is well suited to separate the luminance components from the chrominance components.

Returning now to FIG. 2, it will be seen that the circuit 59 according to this invention for applying frequency converting signals to the frequency converter 40 includes a frequency converter 60 having its output connected to frequency converter 40 and two inputs which respectively receive the outputs from a fixed oscillator 61 and a voltage-controlled variable frequency oscillator 62. The output of voltage-controlled oscillator 62 is also applied to two frequency dividers 63 and 64 which have different dividing ratios, as hereinafter described in detail, and which have their outputs respectively connected to input terminals 65*a* and 65*b* of a switching circuit or device 65. The switching circuit

65 is operated by the flip-flop 47 so as to alternately transmit the frequency divided signals received by input terminals 65*a* and 65*b*, respectively, to an output terminal 65*c* which is connected to one input terminal of a frequency and phase comparator 66. A horizontal synchronizing signal separator circuit 67 is connected to the input terminal 33 which receives the composite color video signal to be recorded, and the output of separator circuit 67 is applied through a frequency divider 68 to another input terminal of comparator 66.

The comparator 66 compares the frequency and phase of the output from switching circuit 65 and of the reference signal or output of frequency divider 68 and, in response to deviations therebetween, provides an error signal or control voltage which is fed back to voltage-controlled oscillator 62 for suitably varying the output frequency of the latter in the direction to achieve the phase-locked state, that is, frequency and phase correspondence between the outputs of switching circuit 65 and frequency divider 68. It will be apparent from the foregoing that voltage-controlled oscillator 62, frequency dividers 63 and 64, switching circuit 65, comparator 66, horizontal synchronizing signal separator 67 and frequency divider 68 comprise a phase-locked loop. In such phaselocked loop, the output frequency of voltage-controlled oscillator 62 is alternately changed between first and second values determined by the output frequency of frequency divider 68 and by the dividing ratios of frequency dividers 63 and 64, respectively, in response to the switching operation of switching circuit 65. The switching circuit 65 is controlled by a pulse signal $P_a$ that originates in flip-flop 47 and is illustrated in line A of FIG. 5. The pulse signal $P_a$ is a square wave that has a negative interval $T_a$ which, in the case of recording a field in each of the parallel tracks, is equal in duration to a television field, and a positive interval $T_b$ of the same duration as the interval $T_a$. Thus, the switching circuit 65 connects the frequency dividers 63 and 64 alternately to the comparator 66 for one field interval at a time, that is, during each interval $T_a$, frequency divider 63 is connected to comparator 66 and, and, during each interval $T_b$, frequency divider 64 is connected to comparator 66.

The separator circuit 67 separates the horizontal synchronizing signal from the color video signal applied to input terminal 33 so as to provide an output at the horizontal or line frequency $f_h$, which is approximately 15.750 KHz in the case of an NTSC signal. Accordingly, during each field interval $T_a$, the output frequency $f_{oa}$ of voltage-controlled oscillator 62 is determined by the following equation:

$$f_{oa} = \frac{N_1 \cdot f_h}{N_a} \qquad (1)$$

in which $N_1$ is the dividing ratio of frequency divider 68 and Na is the dividing ratio of frequency divider 63. Similarly, during each interval $T_b$, the output frequency $f_{ob}$ of voltage-controlled oscillator 62 is determined by the following equation:

$$f_{ob} = \frac{N_1 \cdot f_h}{N_b} \qquad (11)$$

in which $N_b$ is the dividing ratio of frequency divider 64.

In order to reduce or eliminate cross-talk interference between signals recorded in adjacent tracks, it is necessary that the chrominance components of such signals be recorded in the adjacent tracks with carrier frequencies $f_{ca}$ and $f_{cb}$, respectively, that differ from each other by ½(2$k$−1)$f_h$, in the case of NTSC signals, or by ¼(2$k$−1)$f_h$, in the case of PAL signals, in which $k$ is any desired integer. In the embodiment illustrated in FIG. 2, $k$ is desirably selected to have the value of 1 so that the difference between the converted carrier frequencies $f_{ca}$ and $f_{cb}$ for the chrominance signal components may be expressed as follows:

$$f_{cb} - f_{ca} = \tfrac{1}{2} f_h \quad \text{(III)}$$

Figure 4A:
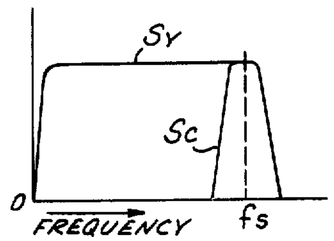
FIGS. 4A–4C are frequency response curves for sections of the circuit shown in FIG. 2.

Referring to FIG. 4A, it will be seen that, in the frequency spectrum of a typical color video signal to be applied to input terminal 33, the band $S_c$ of the chrominance signal components clustered around the chrominance carrier having the frequency $f_s$ of 3.58 MHz in the case of an NTSC signal is included within the band Sy of the luminance signal components. However, the converted carrier frequencies $f_{ca}$ and $f_{cb}$ with which the chrominance signal components are recorded in adjacent tracks are selected so that the bands of the frequency converted chrominance signals S'c are lower than, and not substantially overlapped by the band of the frequency modulated luminance signal components S'y, as shown on FIGS. 4B and 4C. In order to satisfy the foregoing, the embodiment of FIG. 2 employs $$f_{ca} = (44-\tfrac{3}{4})f_h \quad \text{(IV)}$$

and $$f_{cb} = (44-\tfrac{1}{4})f_h \quad \text{(V)}$$

In order to achieve the above values for $f_{ca}$ and $f_{cb}$, frequency converter 40 is typically a balanced modulator which is arranged to subtract the frequencies thereto, while frequency converter 60 is also typically a balanced modulator, but which is arranged to add the frequencies applied thereto. Further, in the embodiment of FIG. 2, oscillator 61 has an output frequency of ($f_s$ − ¼$f_h$), frequency divider 63 has a dividing ratio N$a$ = 1/87, frequency divider 64 has a dividing ratio N$b$ = 1/88, and frequency divider 68 has a dividing ratio $N_1$ = ½. Thus, $f_{oa}$ = (44−½)$f_h$ and $f_{ob}$ = 44 $f_h$.

Figure 5:
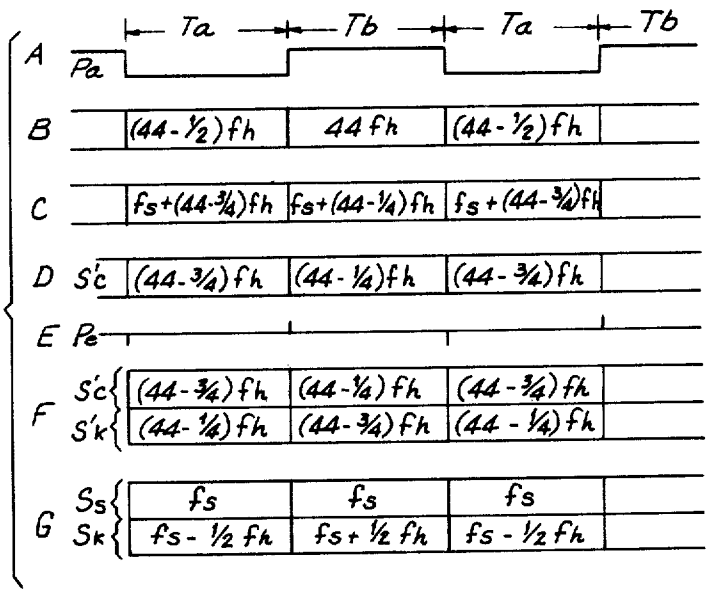
FIG. 5 is a chart of frequency relationships for FIG. 2.

As a result of the above, the frequency of the signal applied from voltage-controlled oscillator 62 to the frequency converter 60 is illustrated in line B of FIG. 5 as being (44−½)$f_h$ for each of the intervals $T_a$, and 44$f_h$ for each of the intervals $T_b$. As mentioned, the frequency converter 60 is arranged to add the frequencies of the signals applied thereto. Therefore, during each field interval $T_a$, the output signal of frequency converter 60, as indicated in line C of FIG. 5, has the frequency $f_s$+(44−¾)$f_h$, and for the next field interval $T_b$, the frequency of the output signal of the frequency converter 60 is $f_s$+(44−¼)$f_h$. These two signals are applied, during alternate field intervals, to the frequency converter 40 which, as previously mentioned, is arranged to subtract the frequencies of the signals supplied thereto.

Figure 4B:
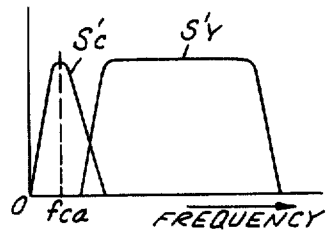
Figure 4C:
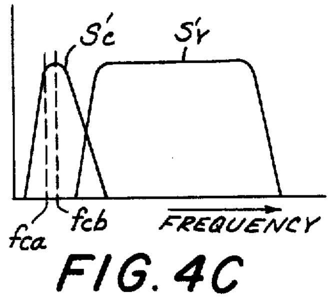

The other input signal to the frequency converter 40 is the chrominance signal comprising components clustered around the original carrier frequency $f_s$ and having frequencies that differ from $f_s$ by integral multiples of $f_h$. Thus, in the frequency converter 40 the signal $S'_c$ is produced having components clustered around the frequency (44−¾)$f_h$ during each field interval $T_a$, as shown in line D of FIG. 5, and around the frequency (44−¼)$f_h$ during each interval $T_b$. The frequency band occupied by this signal $S'_c$ is illustrated on FIGS. 4B and 4C to actually comprise two bands slightly different in frequency from each other. The frequency (44−¾)$f_h$ is the first converted carrier frequency $f_{ca}$ and the frequency (44−¼)$f_h$ is the second converted carrier frequency $f_{cb}$. FIG. 4C shows the relationship between these frequencies, and both FIGS. 4B and 4C show the band of the frequency modulated signal $S'_y$ produced in the frequency modulator 36 as being almost entirely above the band of the frequency converted signal $S'_c$.

The purpose of the delay circuit 35 is to assure that the frequency modulated signal $S'_y$ applied through the high pass filter 37 to the mixing circuit 38 arrives at the mixing circuit exactly in time with the frequency converted signal $S'_c$ from the frequency converter 40 as filtered by the bandpass filter 41. The resulting mixed signal is amplified by the amplifier 42 and applied to the heads or transducers 43 and 44 to be recorded on the tape 45.

Figure 8A:
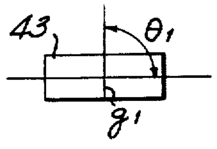
FIGS. 8A and 8B show the transducers used in FIGS. 2 and 6.
Figure 8B:
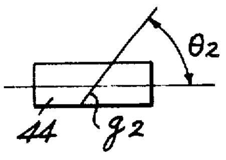

Face views of the transducers 43 and 44 are shown on FIGS. 8A and 8B to indicate that the azimuth angles of their respective gaps $g_1$ and $g_2$ are preferably different. The azimuth angle of the transducer 43 is $\theta_1$ and is 90°, in the example shown, while the azimuth angle $\theta_2$ of the transducer 44 is approximately 60°.

Figure 9:
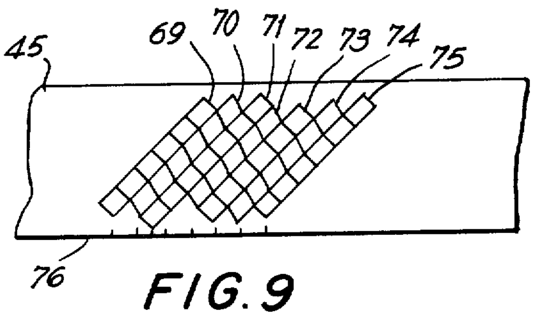
FIG. 9 shows a fragment of a recording made by the transducers in FIGS. 8A and 8B.

FIG. 9 illustrates the recording of several tracks 69–75 on a piece of tape 45, and in which the even-numbered tracks are recorded by the transducer 43 of FIG. 8A and the odd-numbered tracks are recorded by the transducer 44 of FIG. 8B. These tracks are recorded by wrapping the tape 45 approximately halfway around the drum 53 on FIG. 2 along a helical path as illustrated. The tape is moved lengthwise at a certain speed while the motor 49 rotates the arm 50 on which the transducers 43 and 44 are mounted. The relative speed of movement of the tape 45 and speed of rotation of the transducers 43 and 44, and the angle of the helix are such that the tracks recorded by the two transducers are contiguous with each other or may even overlap somewhat. At one edge of the tape are shown the control pulses or signals 76 recorded by the control signal head 54 of FIG. 2. The tracks 69–75 on FIG. 9 are not to scale, but are illustrative of the recording of several line intervals in respective areas or increments of each track and further illustrative of the effect of the difference in azimuth angles of the transducers 43 and 44. It will be seen that, in this case, the ends of the margins between the areas in which the line intervals are recorded in each of the tracks, for example, in the track 70, are aligned, in the direction transverse to the lengths of the tracks, with the adjacent ends of such margins in the next adjacent tracks, for example, the tracks 69 and 71. Except for the fact that the present invention permits both the luminance and chrominance components to be recorded in every line increment of each of the tracks 69–75 even though the tracks are contiguous with each other, the azimuth relationship of the transducers 43 and 44 and the mechanical structure shown in FIG. 2 are in accordance with known practice.

Figure 6:
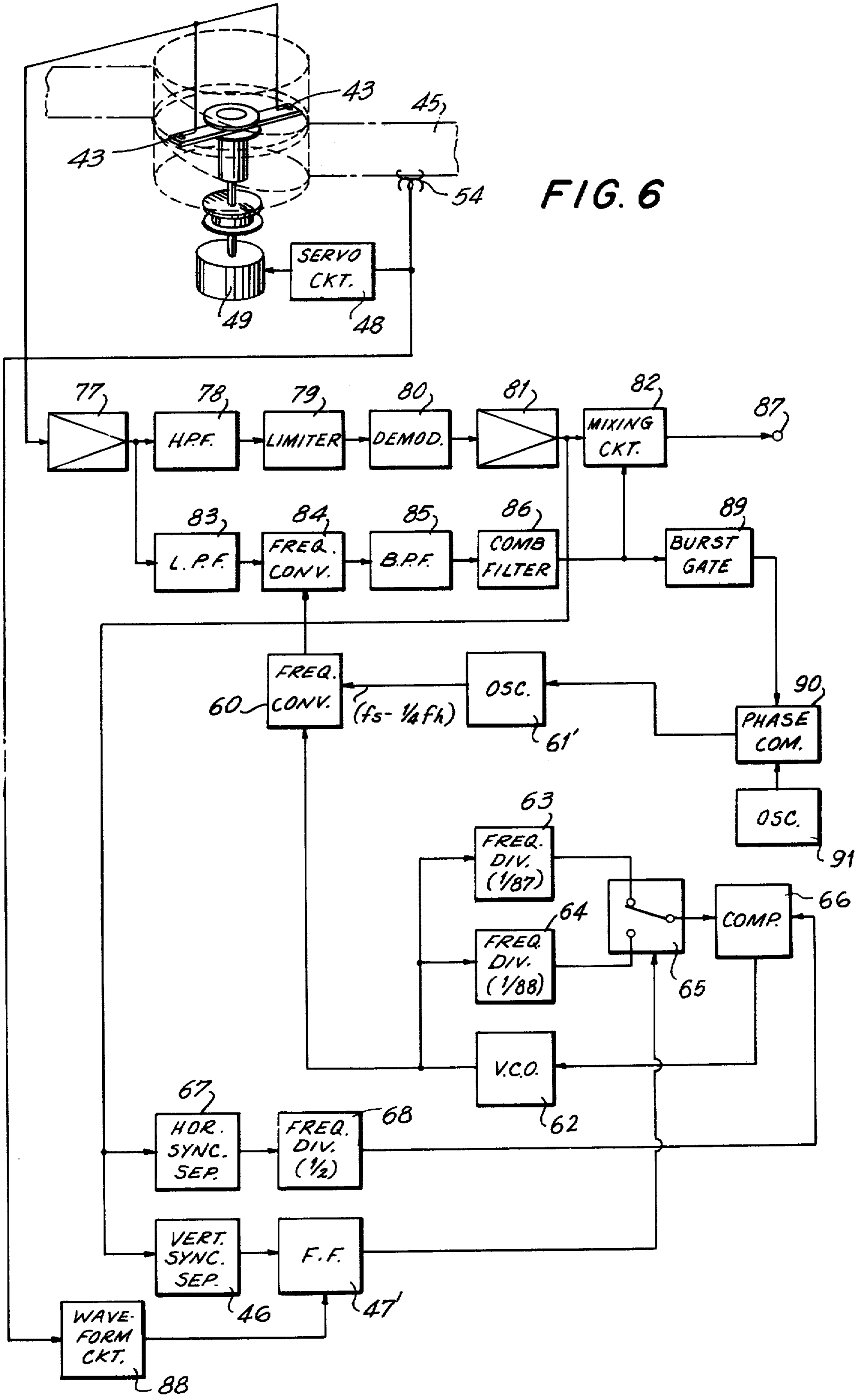
FIG. 6 is a block diagram of a playback or reproducing apparatus to be used for reproducing signals recorded by the apparatus of FIG. 2.

FIG. 6 shows a playback or reproducing apparatus suitable for reproducing color video signals that have been recorded by means of the apparatus of FIG. 2. The mechanical components of the playback apparatus and some of the electrical components are identical with those in FIG. 2 and are identified by the same reference numerals. Among these elements are the heads or transducers 43 and 44, which are operated as playback transducers in FIG. 6 and are connected to the input of an amplifier 77. The output circuit of this amplifier is connected through a high pass filter 78 to a limiter 79 that supplies an amplitude-limited signal to a frequency demodulator 80. The demodulator is connected to another amplifier 81 that supplies a signal to a mixing circuit 82.

The amplifier 77 is also connected through a low pass filter 83 to a frequency converter 84 which is connected through a bandpass filter 85 and a comb filter 86 to the mixing circuit 82. The output of the mixing circuit 82 is connected to a reproduced composite video signal output terminal 87 of the playback or reproducing apparatus.

The amplifier 81 is also connected to a horizontal sync separator circuit 67 that may be the same as the correspondingly numbered circuit in FIG. 2. As in FIG. 2, the horizontal sync separator circuit 67 is connected to the phase and frequency comparator 66 through a frequency divider 68.

The output of amplifier 81 is also connected to the vertical sync separator circuit 46, which supplies the signals to a flip-flop 47'. The flip-flop 47' also receives signals from the control signal head 54 via a wave form circuit 88 that may be, for example, a rectifier.

The output of flip-flop 47' is applied to the switching circuit 65 which, as in FIG. 2, is thereby made operative to alternately apply to comparator 66 the outputs of frequency dividers 63 and 64. Further, a voltage-controlled oscillator 62 is shown to have its output frequency controlled by a control signal or voltage from comparator 66, with the output of voltage-controlled oscillator being applied to frequency dividers 63 and 64 and to frequency converter 60. As before, the circuit elements identified by reference numerals 62–67 on FIG. 6 form a phase-locked loop.

The output of comb filter 86 is also applied to a burst gate 89 which is connected to a phase comparator circuit 90 that also receives a signal from a fixed oscillator 91 and controls the oscillator 61'. The output of oscillator 61' is applied as an input to frequency converter 60, while the output of frequency converter 60 is applied to frequency converter 84 so that the latter will be effective to reconvert the frequencies $f_{ca}$ and $f_{cb}$, with which the chrominance signal components have been recorded in adjacent tracks, back to a common frequency, which is preferably the original chrominance carrier frequency $f_s$.

More specifically, during operation of the reproducing or playback apparatus of FIG. 6, demodulation of the frequency modulated luminance signal reproduced from the tape 45 by transducers 43 and 44 and passed through the circuit that includes amplifier 77, filter 78, limiter 79, demodulator 80 and amplifier 81 is effected in a well-known manner. The advantage of the invention concerns mainly the handling of the frequency converted chrominance signal components of the reproduced signals.

The oscillator 91 produces the frequency $f_s$(3.58MHz) which is compared, as to phase, with the output from burst gate 89 by means of phase comparator 90, and the resulting control signal from the latter controls oscillator 61' so that the oscillator 61' applies a phase controlled signal, at the frequency $(f_s-\frac{1}{4}f_h)$, to frequency converter 60. The phase-locked loop of FIG. 6 is controlled by the pulses from flip-flop 47' applied to switching circuit 65 so that the output signals of voltage-controlled oscillator 62 are alternated between the frequencies $f_{oa}=(44-\frac{1}{2})f_h$ and $f_{ob}=44f_h$ during the field intervals $T_a$ and $T_b$, respectively. Such output signals from the voltage-controlled oscillator 62 on FIG. 6 are alternately combined in frequency converter 60 with the signal from the oscillator 61' to alternately produce frequency converting signals having the frequencies listed in line C of FIG. 5 as $f_s+(44-\frac{3}{4})f_h$ during each interval $T_a$ and $f_s+(44-\frac{1}{4})f_h$ during each interval $T_b$. These signals are applied alternately to the frequency converter 84 which is arranged to subtract the frequencies of the signals applied thereto.

The frequency converter 84 also receives, during alternate field intervals, the signals $S'_c$ clustered around the respective carrier frequencies $f_{ca}=(44-\frac{3}{4})f_h$ and $f_{cb}=(44-\frac{1}{4})f_h$. The relative timing of the two sets of signals applied to the frequency converter 84 corresponds to the timing of the control signal pulses 76 recorded along the edge of the tape 45 (FIG. 9) by the transducer 54 when it is operating as a recording device in the apparatus of FIG. 2. When the same control transducer or head 54 is operating as a playback or reproducing device, the control pulses from it are the pulses $P_e$ in line E of FIG. 5. These pulses are rectified in the waveform circuit 88 so that only the pulses of one polarity are allowed to pass through to the flip-flop 47' where they cooperate with vertical sync pulses from the vertical sync separator 46 to control the phase of the pulse signal $P_a$ in line A of FIG. 5. As a result of this interrelation, during the interval $T_a$ when the signal $S'_c$ in line D of FIG. 5 applied to the frequency converter 84 from low pass filter 83 has the carrier frequency $f_{ca}=(44-\frac{3}{4})f_h$, the switching circuit 65 will connect frequency divider 63 with comparator 66, and as a result the signal supplied by frequency converter 60 to frequency converter 84 will have the frequency $f_s+(44-\frac{3}{4})f_h$. These two signals, when subtracted by the frequency converter 84, result in an output signal $S_s$ that includes the original carrier frequency $f_s$ and side bands spaced therefrom by integral multiples of the frequency $f_h$, as indicated on line C of FIG. 5. This frequency reconverted chrominance signal passes through bandpass filter 85 and through comb filter 86 to the mixing circuit 82 where it mixes with the demodulated luminance signal from the amplifier 81 to form a reconstituted composite video signal at the output terminal 87.

Figure 7A:
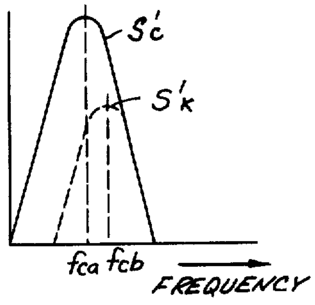
FIGS. 7A and 7B are response curves for FIGS. 2 and 6.

At the same time that the reproduced chrominance component signal having the carrier frequency $f_{ca}=(44-\frac{3}{4})f_h$ characteristic of the track being scanned is applied to frequency converter 84, a cross-talk interference signal picked up from the adjacent recorded tracks and having frequency converted chrominance components with a carrier frequency $f_{cb}=(44-\frac{1}{4})f_h$ is also being applied to the frequency converter 84. The cross-talk interference signal is identified in line F of FIG. 5 and in FIG. 7A as the signal $S'_k$. As shown in FIG. 7A, the amplitude of the cross-talk signal $S'_k$ is substantially less than the amplitude of the desired signal $S'_c$, and this difference in amplitude is beneficial in reducing an interference effect from the signal $S'_k$. However, of far more significance is the frequency interleaving relationship between the signals $S'_c$ and $S'_k$.

This frequency interleaving relationship causes the incorrect, or undesired, frequency converted chrominance component signal, that is, the cross-talk signal, applied to the frequency converter 84 to be converted therein from the signal $S'_k$ in line F of FIG. 5 to the signal $S_k$ in line G of FIG. 5, where it is shown to have a carrier frequency $f_s$—½($f_h$). As may be seen in FIG. 3B, such a carrier frequency corresponds to a node in the response curve of the comb filter 86 and therefore will be greatly attenuated or blocked by the filter. The frequency response of this filter is $\sqrt{2(1-\cos w/f_h)}$. In addition, all of the side bands of the undesired frequency converted signal $S_k$ will be at frequencies that are greatly attenuated by the comb filter 86.

Figure 7B:
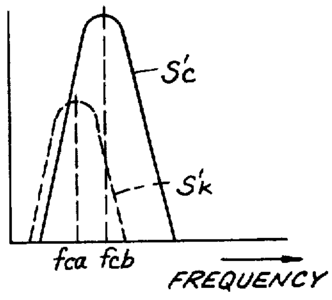

The comb filter 86 produces the same beneficial elimination of interference or cross-talk chrominance component signals during each interval $T_b$ as during each interval $T_a$. During the interval $T_b$, the desired frequency converted chrominance component signal $S'_c$ in lines D and F of FIG. 5 has the carrier frequency $f_{cb}$=(44—¼)$f_h$ while the cross-talk signal $S'_k$ in line F of FIG. 5 and shown in FIG. 7B has the carrier frequency $f_{ca}$=(44—¾)$f_h$. The desired signal is reconverted by the frequency converting signal $f_s$+(44—¼)$f_h$ from frequency converter 60, that is, the sum of the signal 44f$_h$ from the oscillator 62 and the signal ($f_s$¼$h$) from the oscillator 61', to produce, at the output of frequency converter 84 the desired chrominance signal $S_s$ having the original carrier frequency $f_s$ as illustrated in line G of FIG. 5. At the same time the undesired chrominance component signal picked up from adjacent tracks as cross-talk interference, and having the carrier frequency (44—¾)$f_h$ is frequency converted in frequency converter 84 into the signal $S_k$ in line G of FIG. 5 with a carrier frequency $f_s$+½($f_h$). As may be seen in FIG. 3B, this carrier frequency is above the frequency $f_s$ but is also a frequency that is greatly attenuated by the comb filter 86, as are all of the side bands of the frequency converted cross-talk signal.

Thus, the comb filter 86 greatly attenuates cross-talk interference chrominance signals while transmitting the desired chrominance component signals, no matter whether the desired signals have a higher or a lower carrier frequency than the undesired interference signals. The only requirement is that the carriers of the desired and undesired signals have a frequency-interleaving relationship with each other. This relationship requires that the two carrier signals with which the frequency converted chrominance components are recorded have the relationship:

$$f_{ca} - f_{cb} = ½(2k - 1)f_h.$$

As previously indicated, in the apparatus of FIGS. 2 and 6, $k$ has the value of 1, although it could be any integer. However, by making $k = 1$, the minimum frequency difference is obtained between $f_{ca}$ and $f_{cb}$ so that the band of the frequency converted chrominance signal components and the band of the frequency modulated luminance signal components can be easily separated from the reproduced signals, for example, by means of the filters 78 and 83.

Figure 10:
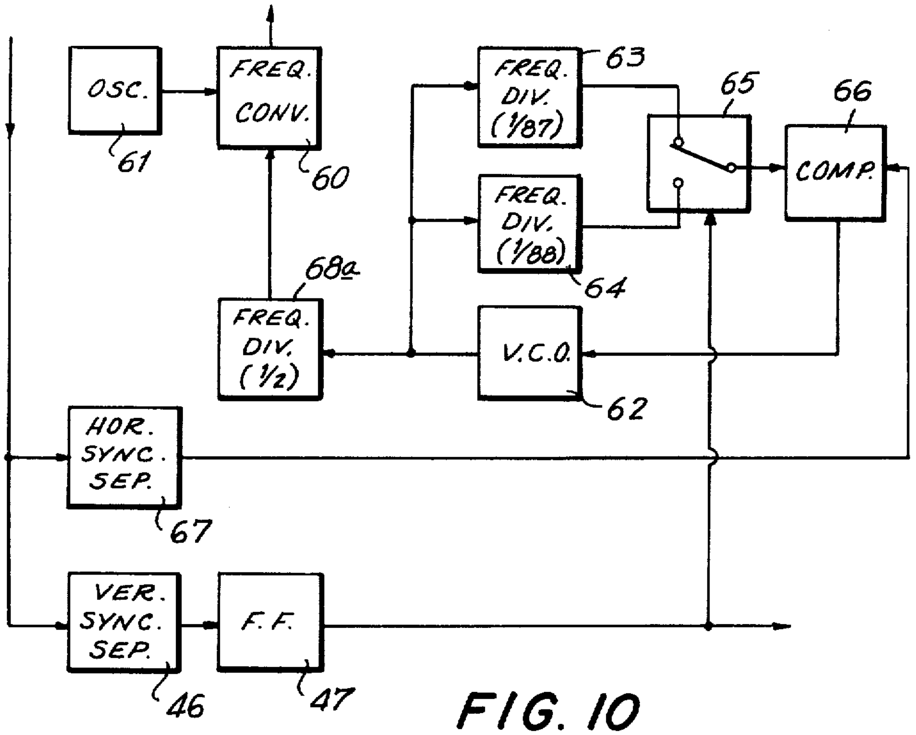
FIGS. 10 and 11 are block diagrams illustrating respective modifications of the recording apparatus of FIG. 2.

Referring now to FIG. 10, it will be seen that, in a modification of the recording apparatus of FIG. 2, the frequency divider 68 having a dividing ratio of ½ is omitted between horizontal sync separator 67 and comparator 66, and is replaced by a similar frequency divider 68*a* having a dividing ratio of ½ and through which the output of voltage-controlled oscillator 62 is applied to frequency converter 60. It will be apparent that, in the modified arrangement of FIG. 10, the output of voltage-controlled oscillator 62 has the frequency $f_{oa}$=87$f_h$ during each field interval $T_a$ and the frequency $f_{ob}$=88$f_h$ during each field interval $T_b$. However, since the output of oscillator 62 is applied to converter 60 through frequency divider 68*a* having the dividing ratio of ½, the signals actually applied to frequency converter 60 during the field intervals $T_a$ and $T_b$ have the same frequencies (44—½)$f_h$ and 44$f_h$, respectively, as in the apparatus of FIG. 2. Of course, the circuit arrangement of the reproducing apparatus of FIG. 6 can also be modified in the same manner as shown on FIG. 10 with respect to the recording apparatus.

In the above described embodiments of the invention, the output frequency of the voltage-controlled oscillator 62 has been changed in successive field intervals $T_a$ and $T_b$ by causing the switching circuit 65 to suitably change the frequency divider 63 or 64 through which such output frequency is compared in comparator 66 with the horizontal sync signal frequency $f_h$ from separator 67. However, the same change-over of the output frequency of voltage-controlled oscillator 62 may be realized by comparing the output frequency of oscillator 62 with the frequency of the horizontal sync signal after the latter has been multiplied by a ratio that is changed for the successive field intervals $T_a$ and $T_b$. For example, as shown on FIG. 11, the output of horizontal sync separator 67 may be applied to frequency multipliers 63*a* and 64*a* which respectively have multiplying ratios of 87/2 and 88/2 and which have their outputs alternately applied to comparator 66 through a switching circuit 65' operated by flip-flop 47. Thus, during each field interval $T_a$, the output frequency $f_{oa}$ of voltage-controlled oscillator is made equal to the frequency (44—½)$f_h$ of the signal applied to comparator 66 through frequency multiplier 63*a* and switching circuit 65'. Similarly, during each field interval $T_b$, the output frequency $f_{ob}$ of the voltage-controlled oscillator 62 is made equal to the frequency 44$f_h$ of the signal applied to comparator 66 through frequency mutliplier 64*a* and switching circuit 65'. Apart from the manner in which the change of the output frequency of the voltage-controlled oscillator 62 is obtained, it will be apparent that the recording apparatus of FIG. 11 will operate in the same manner as has been described above with respect to the apparatus of FIG. 2. Further, it will be seen that the reproducing apparatus of FIG. 6 may be modified in the same manner as has been shown on FIG. 11 with respect to the reproducing apparatus.

In all of the above described embodiments of the invention, the change in the output frequency of the voltage-controlled oscillator 62 for the successive field intervals $T_a$ and $T_b$ has been achieved solely by the control voltage issuing from comparator 66 due to the inequality of the input signals thereto in response to either a change in the dividing ratio with which the output of oscillator 62 is fed back to comparator 66 or a change in the multiplying ratio with which the horizontal or line frequency $f_h$ is applied to such comparator. However, upon each such change in the dividing ratio or in the multiplying ratio, there may be a transient in the output frequency of voltage-controlled oscillator 62, that is, a slight delay may be experienced before the output of oscillator 62 stabilizes at the new or changed frequency. In order to avoid the foregoing, the recording and/or reproducing apparatus according to this invention preferably is provided with means, other than the control signal or voltage from the comparator 66, for changing the output frequency of the voltage-controlled varible frequency oscillator 62 for the successive field intervals of the signals being recorded or reproduced. Such means desirably has the effect of changing or shifting the center frequency of the voltage-controlled oscillator 62 to approximately the value of the output frequency required from the voltage-controlled oscillator for the respective field interval, whereupon the control voltage from the comparator 66 functions to lock the output frequency at such value for the duration of that field interval.

Figure 12:
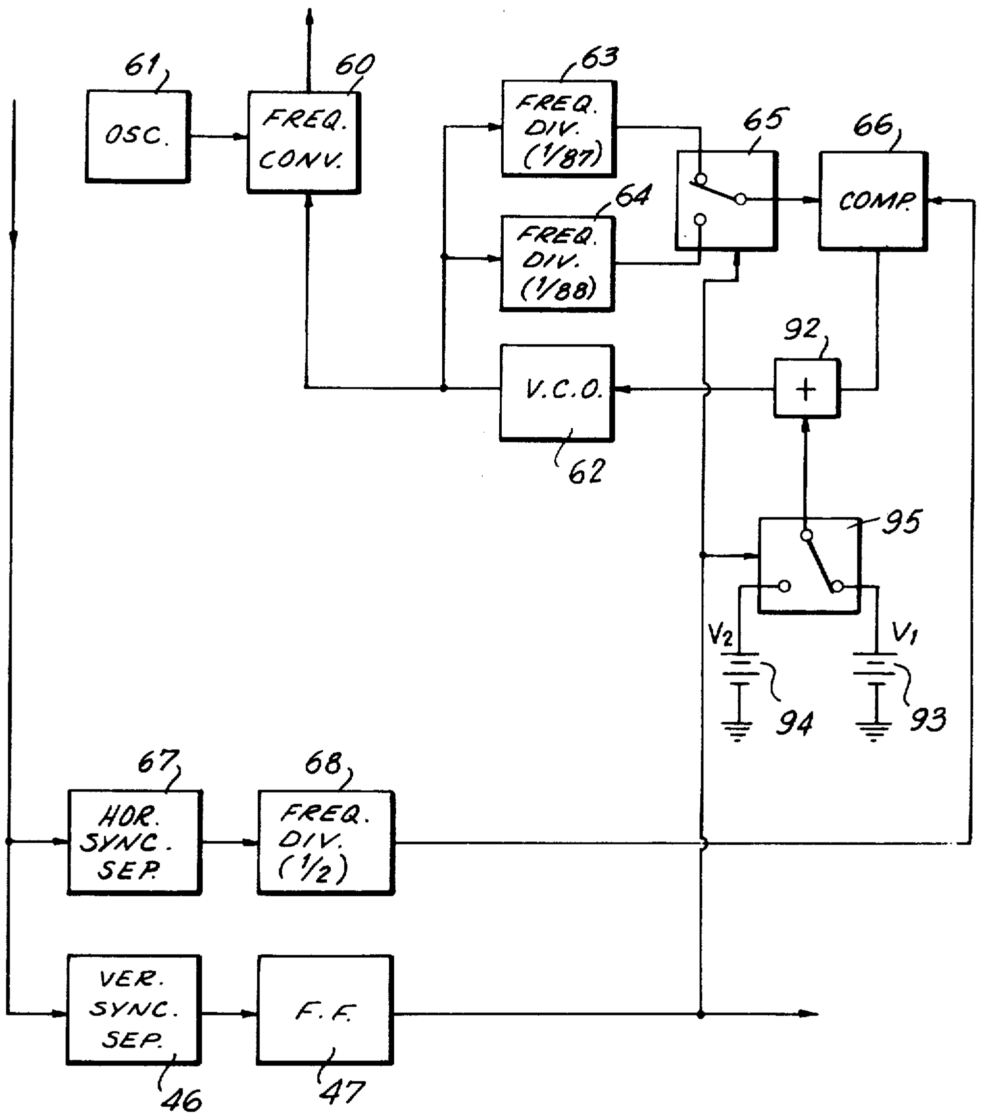
FIG. 12 is a block diagram similar to a portion of FIG. 2, but showing an arrangement according to the invention for varying the center frequency of a voltage-controlled oscillator included in the circuit by which the frequency converted chrominance components are recorded with different carrier frequencies in adjacent tracks on the record medium.

For example, as shown on FIG. 12, the means for changing or shifting the center frequency of the voltage-controlled oscillator 62 in the recording apparatus of FIG. 2 may comprise an adding circuit 92 interposed in the connection between comparator 66 and oscillator 62 for superposing a variable or changeable bias voltage on the control voltage from the comparator. In the illustrated embodiment, the changeable bias voltage is selectively obtained from voltage sources 93 and 94 providing different D.C. voltages $V_1$ and $V_2$ which are alternately applied to adding circuit 92 through a switching circuit or device 95 operated in synchronism with switching circuit 65 by means of the flip-flop 47. The voltages $V_1$ and $V_2$ are selected so that, at the commencement of each field interval $T_a$, at which time switching circuits 65 and 95 are changedover to the positions shown on FIG. 12, the bias voltage $V_1$ superposed in adding circuit 92 on the control voltage from comparator 66 will cause an immediate shift of the output frequency of oscillator 62 to the value $(44-\frac{1}{2})f_h$. On the other hand, at the commencement of each field interval $T_b$, the change-over of switching circuits 65 and 95 from the positions shown on FIG. 12 will cause the bias voltage $V_2$ to be superposed on the control voltage to oscillator 62 with the result that the output frequency of the latter will be immediately shifted to the value $44f_h$.

Figure 13:
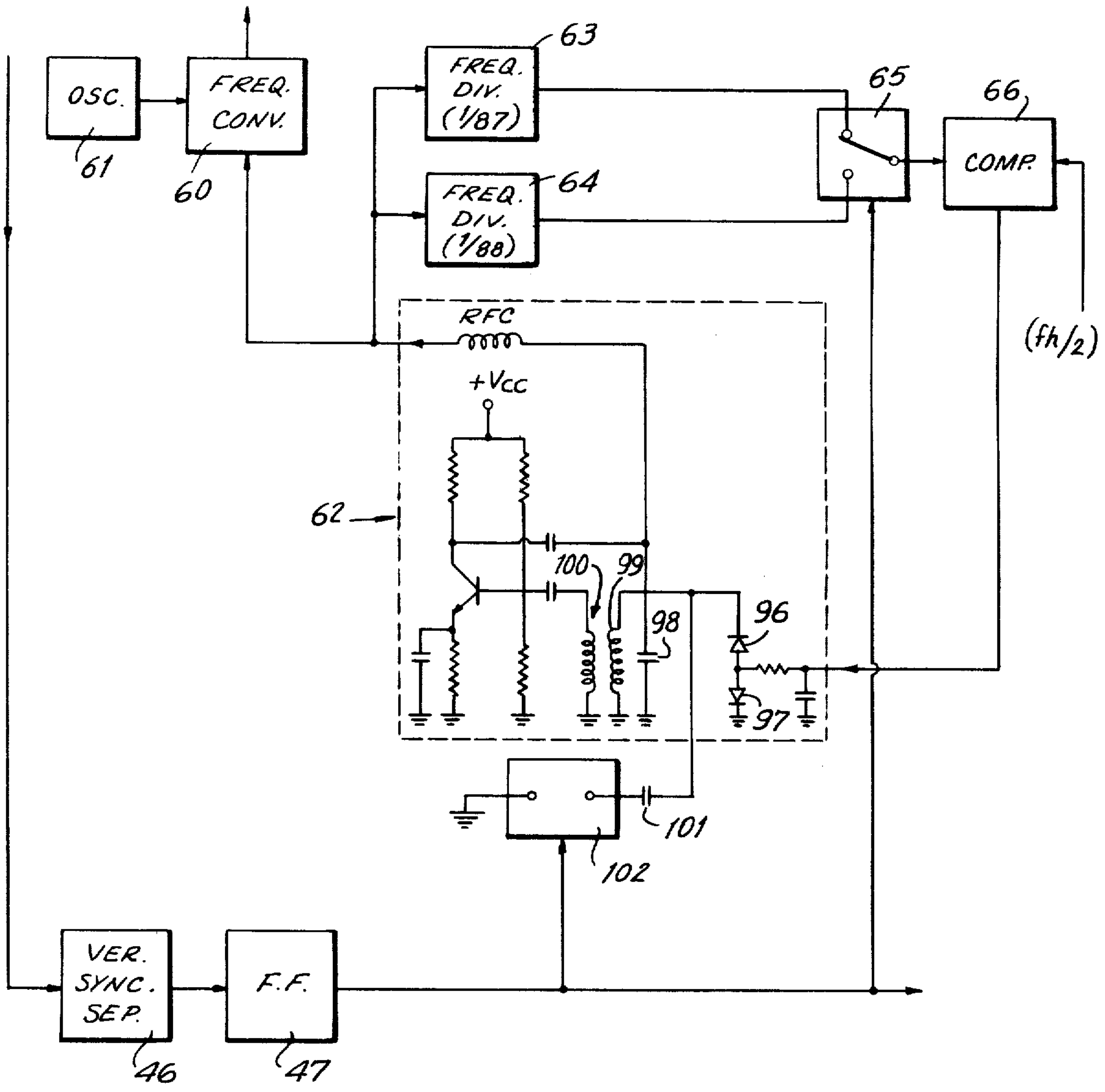
FIGS. 13 and 14 are views similar to that of FIG. 12, but showing additional embodiments of the invention for changing the center frequency of the voltage-controlled oscillator.

The shifting of the center frequency of the voltagecontrolled oscillator 62 for the successive field intervals $T_a$ and $T_b$ may also be achieved by suitably varying other characteristics of the voltage-controlled oscillator. For example, as shown on FIG. 13, the voltage-controlled oscillator 62 is represented to be of a known type having the control voltage from comparator 66 applied between varactor diodes 96 and 97 for varying the resonance frequency of an LC-circuit comprised of a capacitor 98 and an inductor 99 which is a winding of the coupling 100. With the oscillator 62 having the configuration shown on FIG. 13, a change in the control voltage applied between varactor diodes 96 and 97 is effective to change the frequency at the output of oscillator 62 which is connected to frequency converter 60 and frequency dividers 63 and 64, as in the recording apparatus of FIG. 2. In accordance with the present invention, an additional capacitor 101 is connected in parallel with capacitor 98 to ground through a switching circuit or device 102 which is operated by flip-flop 47. Thus, when switching circuit 102 is closed, for example, during each field interval $T_a$, additional capacitor 101 is included in the LC-circuit of oscillator 62 to provide the latter with a center frequency approximating the desired output frequency $(44-\frac{1}{2})f_h$ for each field interval $T_a$. Conversely, when switching circuit 102 is opened, for example, during each field interval $T_b$, capacitor 101 is effectively removed from the LC-circuit to provide oscillator 62 with a center frequency approximating the output frequency $44f_h$ desired for each field interval $T_b$.

Figure 14:
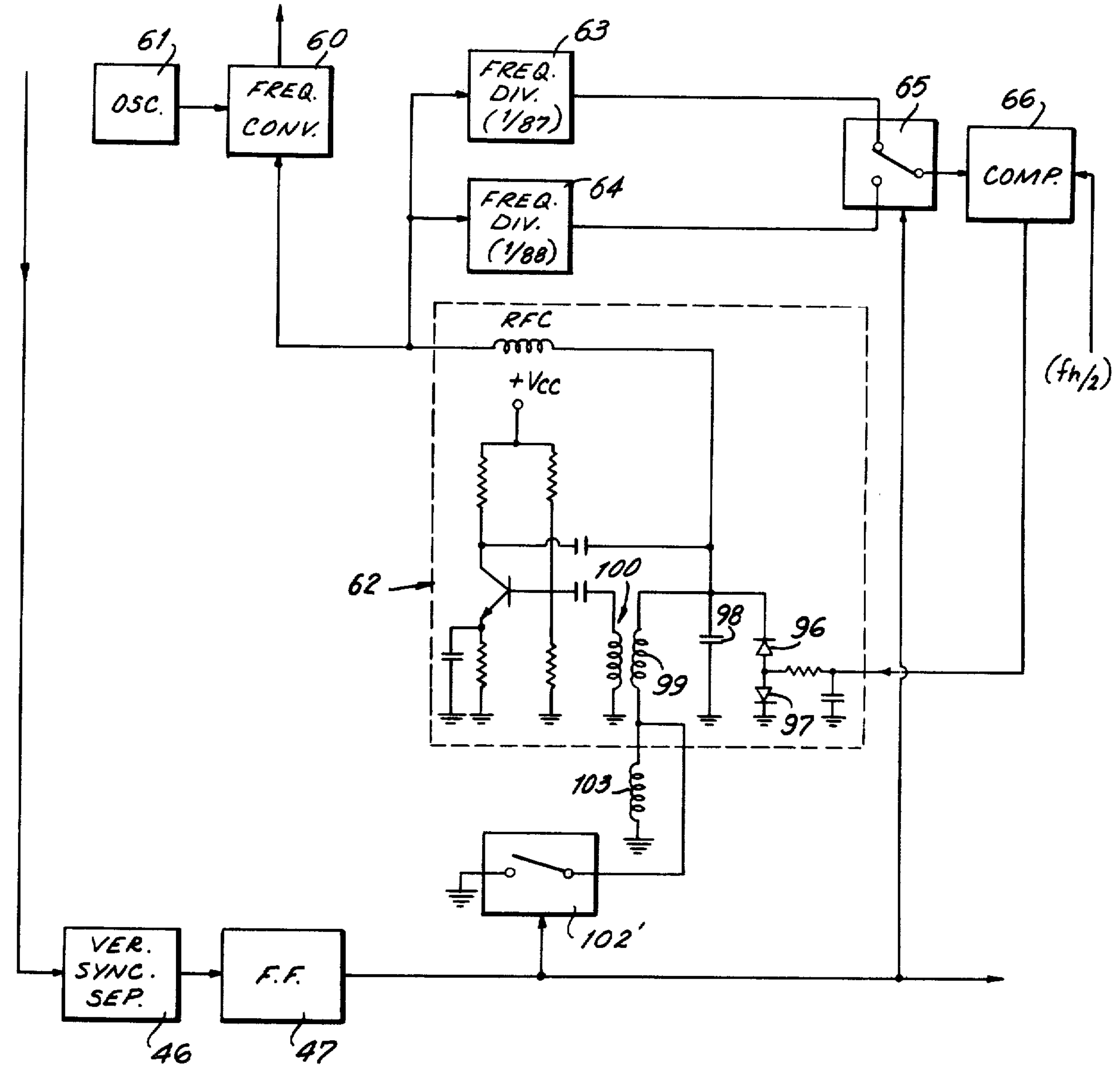

Of course, other characteristics of the LC-circuit in voltage-controlled oscillator 62 can be varied to shift the center frequency of the oscillator for the successive field intervals. For example, as shown on FIG. 14, an additional inductor 103 may be connected in series with inductor 99 between the latter and ground, and a switching circuit or device 102' may be connected between the junction of inductors 99 and 103 and ground. The switching circuit 102' is again operated by flip-flop 47 so as to be alternately in its open and closed conditions during the successive field intervals $T_a$ and $T_b$. It will be apparent that, when switching circuit 102' is opened, as shown, the effective inductance of the LC-circuit of oscillator 62 is constituted by both inductors 99 and 103 to provide the voltage-controlled oscillator 62 with one central frequency. However, when switching circuit 102' is closed, the additional inductor 103 is effectively removed from the LC-circuit so that oscillator 62 has a different center frequency. Accordingly, as switching circuit 102' is operated or changed-over between its opened and closed conditions for the successive field intervals, the center frequency of voltage-controlled oscillator 62 is suitably changed to substantially agree with the output frequencies thereof required for the respective field intervals.

Figure 11:
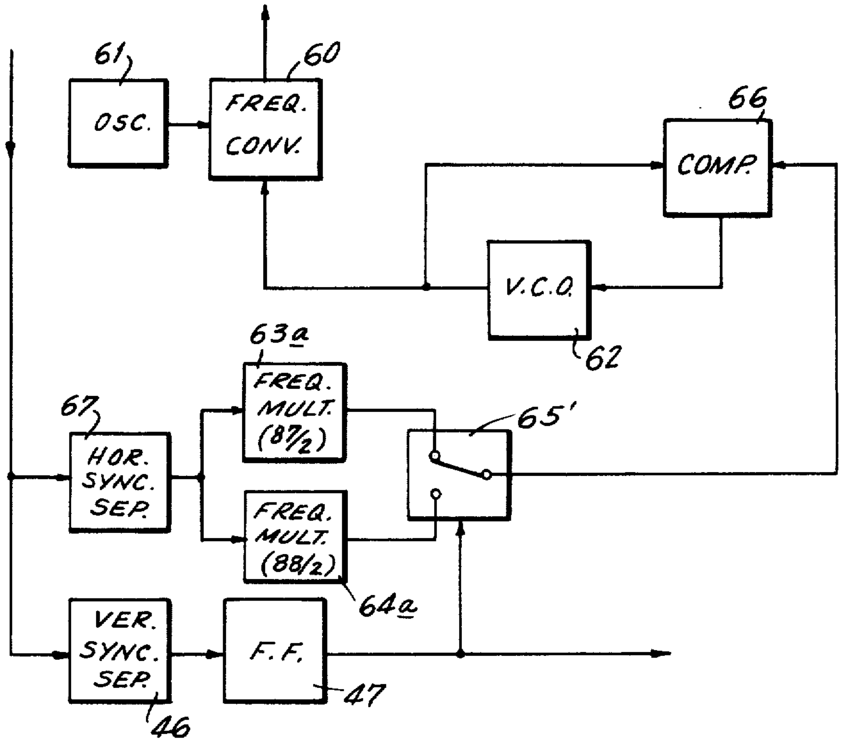

It will be apparent that the arrangements described above with reference to FIGS. 12, 13 and 14 for changing the center frequency of the voltage-controlled oscillator 62 for successive field intervals in the recording apparatus of FIG. 2 can also be applied to the reproducing apparatus of FIG. 6 as well as to the modifications of the recording apparatus shown on FIGS. 10 and 11. In all such cases, the effect of the present invention will be to ensure that the converting or reconverting frequency applied to the converter 60 in each field interval will be immediately stabilized at the desired value.

Although several embodiments of the invention have been described in detail herein with reference to the accompanying drawings, it is to be understood that the invention is not limited to those precise embodiments, and that various changes and modifications, in addition to those specifically referred to above, may be effected by one skilled in the art without departing from the scope or spirit of the invention as defined in the appended claims.

What is claimed is:

1. In apparatus by which periodic information signals having an original carrier frequency are recorded in successive parallel tracks on a record medium, and in which frequency converting means receives said information signals with said original carrier frequency and first and second frequency converting signals are alternately applied to said frequency converting means for causing the latter to convert the carrier of said information signals to different first and second carrier frequencies with which the information signals are recorded in tracks that are next adjacent to each other: a circuit for producing said first and second frequency converting signals comprising a phase-locked loop including a voltage-controlled variable frequency oscillator for producing an output signal at a frequency determined at least by a control voltage applied thereto, means for producing a reference signal, comparator means receiving predetermined ratios of said output signal and said reference signal, respectively, and comparing the same to provide said control voltage for the voltage-controlled oscillator, and means selectively providing first and second values of one of said ratios which values respectively correspond to said first and second frequency converting signals; and control means selecting said first and second values of said one ratio during the recording of said information signals in said tracks that are next adjacent each other.

2. An apparatus according to claim 1; in which said information signals are comprised of first intervals and predetermined numbers of second intervals included in each of said first intervals; said second intervals are recorded in respective areas of the successive parallel tracks with the ends of the margins between the successive areas in which said second intervals are recorded in each of said tracks being aligned, in the direction transverse to the lengths of the tracks, with the adjacent ends of the margins between the successive areas in which said second intervals are recorded in the next adjacent tracks; and said first and second carrier frequencies are in frequency-interleaving relationship to each other, and to said original carrier frequency and the frequency of said second intervals.

3. An apparatus according to claim 1; in which said means selectively providing said first and second values of said one ratio includes first and second frequency dividers receiving said output signal of the voltage-controlled oscillator and respectively having first and second dividing ratios corresponding to said first and second values of said one ratio, and switch means operated by said control means for alternately applying the frequency divided outputs of said first and second frequency dividers to said comparator means.

4. An apparatus according to claim 1; in which said means selectively providing said first and second values of said one ratio includes first and second frequency multipliers receiving said reference signal and respectively having first and second multiplying ratios corresponding to said first and second values of said one ratio, and switch means operated by said control means for alternately applying the frequency multiplied outputs of said first and second frequency multipliers to said comparator means.

5. An apparatus according to claim 1; further comprising means responsive to said control means for changing the center frequency of said voltage-controlled oscillator during the recording of said information signals in said tracks that are next adjacent each other.

6. An apparatus according to claim 5; in which said means for changing the center frequency of the voltage-controlled oscillator includes sources of first and second bias voltages, and means for alternately superposing said first and second bias voltages on said control voltage applied from said comparator means to said voltage-controlled oscillator.

7. An apparatus according to claim 5; in which said voltage-controlled oscillator has a resonance circuit with inductive and capacitive elements to determine said center frequency; and said means for changing said center frequency includes an additional one of said elements, and means for selectively including and removing said additional element in respect to said resonance circuit.

8. In apparatus for recording and reproducing periodic information signals having an original carrier frequency, and which comprises recording means for recording the information signals in parallel tracks on a record medium including frequency converting means receiving said information signals with said original carrier frequency, and means for alternately applying first and second frequency converting signals to said frequency converting means for causing the latter to convert the carrier of said information signals to different first and second carrier frequencies with which the information signals are recorded in tracks that are next adjacent to each other; and reproducing means including transducer means for reproducing information signals recorded in each of said tracks along with cross-talk signals from tracks next adjacent thereto, frequency reconverting means receiving the reproduced information signals and cross-talk signals, means for alternately applying first and second frequency reconverting signals to said frequency reconverting means so as to cause the latter to reconvert the carrier of said information signals reproduced from each of said tracks to a common carrier frequency while the carriers of said cross-talk signals are reconverted to still other carrier frequencies, and comb filter means adapted to pass the frequency reconverted information signals with said common carrier frequency and to substantially block said cross-talk signals reconverted to said other carrier frequencies: said means for alternately applying the first and second frequency converting signals and said means for alternately applying said first and second frequency reconverting signals each comprising a phase-locked loop including a voltage-controlled variable frequency oscillator for producing an output signal at a frequency determined at least by a control voltage applied thereto, means for producing a reference signal, comparator means receiving predetermined ratios of said output signal and said reference signal, respectively, and comparing the same to provide said control voltage for said voltage-controlled oscillator, and means selectively providing first and second values of one of said ratios which respectively correspond to said first converting and reconverting signals and to said second converting and reconverting signals; and control means selecting said first and second values of said one ratio during the recording and reproducing of said information signals in said tracks that are adjacent each other.

9. An apparatus according to claim 8; in which said information signals are comprised of first intervals and predetermined numbers of second intervals included in each of said first intervals; said second intervals are recorded in respective areas of the successive parallel tracks with the ends of the margins between the successive areas in which said second intervals are recorded in each of said tracks being aligned, in the direction transverse to the lengths of the tracks, with the adjacent ends of the margins between the successive areas in which said second intervals are recorded in the next adjacent tracks; and said first and second carrier frequencies are in frequency-interleaving relationship to each other, and to said original carrier frequency and the frequency of said second intervals.

10. An apparatus according to claim 8; in which said means selectively providing said first and second values of said one ratio includes first and second frequency dividers receiving said output signal of the voltage-controlled oscillator and respectively having first and second dividing ratios corresponding to said first and second values of said one ratio, and switch means operated by said control means for alternately applying the frequency divided outputs of said first and second frequency dividers to said comparator means.

11. An apparatus according to claim 8; in which said means selectively providing said first and second values of said one ratio includes first and second frequency multipliers receiving said reference signal and respectively having first and second multiplying ratios corresponding to said first and second values of said one ratio, and switch means operated by said control means for alternately applying the frequency multiplied outputs of said first and second frequency multipliers to said comparator means.

12. An apparatus according to claim 8, further comprising means responsive to said control means for changing the center frequency of said voltage-controlled oscillator during the recording and reproducing of the information signals in said tracks that are next adjacent each other.

13. An apparatus for reproducing periodic information signals which have been recorded in parallel tracks on a record medium with the information signals recorded in tracks that are next adjacent each other having first and second carrier frequencies, and in which the information signals reproduced from each of the tracks along with cross-talk signals from the tracks next adjacent thereto are received by frequency reconverting means which has first and second frequency reconverting signals alternately applied thereto for causing the frequency reconverting means to reconvert the carrier of the information signals reproduced from each of the tracks to a common carrier frequency passing through a comb filter means while the carriers of the cross-talk signals are reconverted to still other carrier frequencies which are substantially blocked by said comb filter means: a circuit for producing said first and second frequency reconverting signals comprising a phase-locked loop including a voltage-controlled variable frequency oscillator for producing an output signal at a frequency determined at least by a control voltage applied thereto, means for producing a reference signal, comparator means receiving predetermined ratios of said output signal and said reference signal, respectively, and comparing the same to provide said control voltage for the voltage-controlled oscillator, and means selectively providing first and second values of one of said ratios which values respectively correspond to said first and second frequency reconverting signals; and control means selecting said first and second values of said one ratio during the reproducing of said information signals in said tracks that are next adjacent each other.

14. An apparatus according to claim 13; in which said information signals are comprised of first intervals and predetermined numbers of second intervals included in each of said first intervals; said second intervals are recorded in respective areas of the successive parallel tracks with the ends of the margins between the successive areas in which said second intervals are recorded in each of said tracks being aligned, in the direction transverse to the lengths of the tracks, with the adjacent ends of the margins between the successive areas in which said second intervals are recorded in the next adjacent tracks; and said first and second carrier frequencies are in frequency-interleaving relationship to each other and to said original carrier frequency and the frequency of said second intervals.

15. An apparatus according to claim 13; in which said means selectively providing said first and second values of said one ratio includes first and second frequency dividers receiving said output signal of the voltage-controlled oscillator and respectively having first and second dividing ratios corresponding to said first and second values of said one ratio, and switch means operated by said control means for alternately applying the frequency divided outputs of said first and second frequency dividers to said comparator means.

16. An apparatus according to claim 13; in which said means selectively providing said first and second values of said one ratio includes first and second frequency multipliers receiving said reference signal and respectively having first and second multiplying ratios corresponding to said first and second values of said one ratio, and switch means operated by said control means for alternately applying the frequency multiplied outputs of said first and second frequency multipliers to said comparator means.

17. An apparatus according to claim 13; further comprising means responsive to said control means for changing the center frequency of said voltage-controlled oscillator during the reproducing of the information signals in said tracks that are next adjacent each other.

18. An apparatus according to claim 17; in which said means for changing the center frequency of the voltage-controlled oscillator includes sources of first and second bias voltages, and means for alternately superposing said first and second bias voltages on said control voltage applied from said comparator means to said voltage-controlled oscillator.

19. An apparatus according to claim 17; in which said voltage-controlled oscillator has a resonance circuit with inductive and capacitive elements to determine said center frequency; and said means for changing said center frequency includes an additional one of said elements, and means for selectively including and removing said additional element in respect to said resonance circuit.

20. In apparatus by which video signals having luminance and chrominance signal components and being comprised of field intervals and line intervals are recorded in respective areas of successive parallel tracks on a record medium with the ends of the margins between the areas in which the line intervals are recorded in each of said tracks being aligned, in the direction transverse to the lengths of the tracks, with the adjacent ends of the margins between the areas in which the line intervals are recorded in the next adjacent tracks, and in which frequency converting means receives said chrominance signal components with an original carrier frequency and alternately converts the latter to different first and second carrier frequencies in response to the application to said frequency converting means of first and second frequency converting signals, respectively, so that said chrominance signal components are recorded with said first and second carrier frequencies in the tracks that are next adjacent to each other: a circuit for producing said first and second frequency converting signals comprising a phase-locked loop including a voltage-controlled variable frequency osocillator for producing an output signal at a freqeuency determined at least by a control voltage applied thereto, means for producing a reference signal, comparator means receiving predetermined ratios of said output signal and said reference signal, respectively, and comparing the same to provide said control voltage for the voltage-controlled oscillator, and means selectively providing first and second values of one of said ratios which values respectively correspond to said first and second frequency converting signals; and control means selecting said first and second values of said one ratio during the recording of said video signals in said tracks that are next adjacent each other.

21. An apparatus according to claim 20; in which said original carrier frequency of the chrominance signal components is in frequency-interleaving relation to the frequency of said line intervals, and said first and second carrier frequencies are in frequency-interleaving relation to each other and to said original carrier frequency and said line interval frequency.

22. An apparatus according to claim 20; in which said means selectively providing said first and second values of said one ratio includes first and second frequency dividers receiving said output signal of the voltage-controlled oscillator and respectively having first and second dividing ratios corresponding to said first and second values of said one ratio, and switch means operated by said control means for alternately applying the frequency divided outputs of said first and second frequency dividers to said comparator means.

23. An apparatus according to claim 20; in which said means selectively providing said first and second values of said one ratio includes first and second frequency multipliers receiving said reference signal and respectively having first and second multiplying ratios corresponding to said first and second values of said one ratio, and switch means operated by said control means for alternately applying the frequency multiplied outputs of said first and second frequency multipliers to said comparator means.

24. An apparatus according to claim 20; further comprising means responsive to said control means for changing the center frequency of said voltage-controlled oscillator during the recording of said chrominance signal components in said tracks that are next adjacent each other.

25. An apparatus according to claim 20; in which a frequency modulator modulates a carrier with said luminance signal components so as to provide the resulting frequency modulated luminance signal component with a band substantially higher than said chrominance signal components with said first and second carrier frequencies, a mixing circuit combines said frequency modulated luminance signal component with said chrominance signal components having said first and second carrier frequencies to provide a composite video signal for recording, said record medium is magnetic, and first and second magnetic transducers having gaps with different azimuth angles are provided for recording said composite video signal in said next adjacent tracks, respectively.

26. In an apparatus for reproducing video signals having luminance and chrominance signal components and comprised of field intervals and line intervals which are recorded in respective areas of successive parallel tracks on a record medium with the ends of the margins between the successive areas in which said line intervals are recorded in each of said tracks being aligned, in the direction transverse to the lengths of said tracks, with the adjacent ends of said margins in the next adjacent tracks, and with said chrominance signal components of video signals recorded in next adjacent tracks having different first and second carrier frequencies, and in which transducer means scan along said tracks one at a time so as to reproduce the video signals recorded in each of said tracks along with cross-talk signals from the tracks next adjacent thereto, means separate said chrominance signal components from the luminance signal component in the reproduced signals, frequency reconverting means receives the separated chrominance signal components and has first and second frequency reconverting signals alternately applied thereto for causing the frequency reconverting means to reconvert the separated chrominance signal components of video signals reproduced from each of said tracks to have a common carrier frequency which passes through a comb filter means while the chrominance signal components of the cross-talk signals are reconverted to other carrier frequencies which are blocked by said comb filter means: a circuit for producing said first and second frequency reconverting signals comprising a phase-locked loop including a voltage-controlled variable frequency oscillator for producing an output signal at a frequency determined at least by a control voltage applied thereto, means for producing a reference signal, comparator means receiving predetermined ratios of said output signal and said reference signal, respectively, and comparing the same to provide said control voltage for the voltage-controlled oscillator, and means selectively providing first and second values of one of said ratios which values respectively correspond to said first and second frequency reconverting signals; and control means selecting said first and second values of said one ratio during the reproducing of said video signals in said tracks that are next adjacent each other.

27. An apparatus according to claim 26; in which said record medium is magnetic, said next adjacent tracks have the video signals magnetically recorded therein with different azimuths, said transducer means includes first and second reproducing magnetic transducers having gaps with different azimuths corresponding to said azimuths of the next adjacent tracks and respectively reproducing video signals recorded in the latter so as to suppress the luminance signal components of the cross-talk signals.

28. An apparatus according to claim 26; in which said means selectively providing said first and second values of said one ratio includes first and second frequency dividers receiving said output signal of the voltage-controlled oscillator and respectively having first and second dividing ratios corresponding to said first and second values of said one ratio, and switch means operated by said control means for alternately applying the frequency divided outputs of said first and second frequency dividers to said comparator means.

29. An apparatus according to claim 26; in which said means selectively providing said first and second values of said one ratio includes first and second frequency multipliers receiving said reference signal and respectively having first and second multiplying ratios corresponding to said first and second values of said one ratio, and switch means operated by said control means for alternately applying the frequency multiplied outputs of said first and second frequency multipliers to said comparator means.

30. An apparatus according to claim 26; further comprising means responsive to said control means for changing the center frequency of said voltage-controlled oscillator during the reproducing of the video signals in said tracks that are next adjacent to each other.

* * * * *